(12) United States Patent
Scoda

(10) Patent No.: US 9,311,281 B2
(45) Date of Patent: Apr. 12, 2016

(54) METHODS FOR FACILITATING WEB PAGE IMAGE HOTSPOTS AND DEVICES THEREOF

(71) Applicant: Usablenet Inc., New York, NY (US)

(72) Inventor: Enrico Scoda, Martignacco (IT)

(73) Assignee: Usablenet Inc., New York, NY (US)

( * ) Notice: Subject to any disclaimer, the term of this patent is extended or adjusted under 35 U.S.C. 154(b) by 503 days.

(21) Appl. No.: 13/796,857

(22) Filed: Mar. 12, 2013

(65) Prior Publication Data

US 2014/0075287 A1    Mar. 13, 2014

Related U.S. Application Data

(60) Provisional application No. 61/698,948, filed on Sep. 10, 2012.

(51) Int. Cl.
*G06F 17/00* (2006.01)
*G06F 17/22* (2006.01)
*G06F 17/30* (2006.01)

(52) U.S. Cl.
CPC ...... *G06F 17/2247* (2013.01); *G06F 17/30038* (2013.01); *G06F 17/30893* (2013.01)

(58) Field of Classification Search
CPC ................. G06F 17/30014; G06F 17/30861; G06F 17/30893
USPC ........................................................ 715/205
See application file for complete search history.

(56) References Cited

U.S. PATENT DOCUMENTS

| 6,075,537 A * | 6/2000 | Adapathya ......... G06F 3/04842 707/E17.013 |
| 7,254,781 B1 * | 8/2007 | Land et al. .................... 715/760 |
| 8,904,277 B2 * | 12/2014 | Kroger ............... G06F 17/3089 705/14.4 |
| 2004/0078753 A1 * | 4/2004 | Doyle ........................ 715/501.1 |
| 2008/0163038 A1 * | 7/2008 | Doyle .............. G06F 17/30876 715/205 |
| 2009/0138813 A1 * | 5/2009 | LaMontagne ................. 715/771 |
| 2009/0288000 A1 * | 11/2009 | McPherson ........... G06F 3/0481 715/704 |
| 2010/0125623 A1 | 5/2010 | Rice et al. |
| 2011/0202531 A1 | 8/2011 | Zuckerberg et al. |

(Continued)

FOREIGN PATENT DOCUMENTS

| WO | 2012011151 A1 | 1/2012 |
| WO | 2012030550 A1 | 3/2012 |

OTHER PUBLICATIONS

Namiot et al., Context-Aware Data Discovery, IEEE 2012, pp. 134-141.*

(Continued)

*Primary Examiner* — Cong-Lac Huynh
(74) *Attorney, Agent, or Firm* — LeClairRyan, a Professional Corporation

(57) ABSTRACT

A method, non-transitory computer readable medium, and hotspot management computing apparatus that receives a JavaScript Object Notation with Padding (JSONP) request from a client computing device, wherein the JSONP request comprises an identifier associated with a selected hotspot associated with an image of a first web page. A HyperText Markup Language (HTML) fragment is generated based on the identifier, wherein the HTML fragment defines a first description associated with the hotspot and an input element associated with a Uniform Resource Locator (URL) of a second web page including a second description associated with the hotspot. The HTML fragment is sent to the requesting client computing device.

45 Claims, 6 Drawing Sheets

(56) References Cited

U.S. PATENT DOCUMENTS

| | | | | |
|---|---|---|---|---|
| 2011/0264736 | A1 | 10/2011 | Zuckerberg et al. | |
| 2012/0054596 | A1* | 3/2012 | Kroger | G06F 17/3089 715/234 |
| 2012/0218171 | A1* | 8/2012 | Fujigaki | 345/8 |
| 2012/0246184 | A1* | 9/2012 | Rothschild | G06F 17/30047 707/758 |
| 2012/0297280 | A1* | 11/2012 | Hinson | G06F 17/30899 715/207 |
| 2013/0073686 | A1* | 3/2013 | Sandholm | 709/219 |
| 2013/0086112 | A1* | 4/2013 | Everingham | G06F 17/30893 707/780 |
| 2013/0110814 | A1* | 5/2013 | Mohapatra | G06F 17/30873 707/710 |
| 2013/0246266 | A1* | 9/2013 | Coleman et al. | 705/44 |
| 2013/0268591 | A1* | 10/2013 | Chen | H04L 51/32 709/204 |
| 2014/0359462 | A1* | 12/2014 | Khalil | G06Q 10/10 715/738 |

OTHER PUBLICATIONS

Skjaeveland, Sgvizler: A JavaScript Wrapper for Easy Visualization of SPARQL Result Sets.*

Ringas et al., CLIO: Blending the Collective Memory with the Urban, ACM 2011, pp. 185-194.*

Casteleyn et al., Assisting Mobile Web Users: Client-Side Injection of Context-Sensitive Cues into Websites, ACM 2010, pp. 442-449.*

International Search Report and Written Opinion for International Patent Application PCT/US2013/059087, mailed Dec. 26, 2013.

Yabuki, T. et al., "Development of Collaboration Environments on Web 1.0", Creating, Connecting and Collaborating Through Computing, IEEE 5th International Conference on Jan. 1, 2007, pp. 25-30 (2007).

European Search Report for European Patent Application No. 13779719.7 (Mar. 30, 2015).

* cited by examiner

METHODS FOR FACILITATING WEB PAGE IMAGE HOTSPOTS AND DEVICES THEREOF

This application claims the benefit of U.S. Provisional Patent Application Ser. No. 61/698,948, filed Sep. 10, 2012, which is hereby incorporated by reference in its entirety.

FIELD

This technology generally relates to web page image hotspots and, more particularly, to methods, non-transitory computer readable medium, apparatuses that facilitate establishing and interacting with web page image hotspots.

BACKGROUND

Images have become increasingly pervasive across the Internet, particularly with respect to social media and retail web sites for example, although many different types of web sites host images. Hotspots, or identified regions of images, are often established in order for users to associate metadata or other information with the images. For example, a host of an image on a social media web site can establish a hotspot (often referred to as "tagging") to indicate another user present in the image. Upon selection of the hotspot, the other user's name and a link to the other user's profile can be displayed, for example. On a retail web site, a host may identify a region of an image including an item for sale as a hotspot. Upon selection of the hotspot by a user, content regarding the item can be displayed, often with a link to a more detailed description of the item.

However, web browsers generally prohibit communication across domains based on a same origin policy. Accordingly, the available content for a user to associate with a web page image hotspot is generally limited to content hosted by a web server in the same domain as the web page that includes the image. Additionally, web services hosted by web servers, and configured to identify content to be associated with a hotspot, are often developed for a single domain. Accordingly, such web services do not provide an interface or structure common to any other web service configured to provide similar functionality but associated with a different domain.

SUMMARY

A method for facilitating interaction with a web page image hotspot includes receiving, by a hotspot management computing apparatus, a JavaScript Object Notation with Padding (JSONP) request from a client computing device, wherein the JSONP request comprises an identifier associated with a selected hotspot associated with an image of a first web page. A HyperText Markup Language (HTML) fragment is generated, by the hotspot management computing apparatus, based on the identifier, wherein the HTML fragment defines a first description associated with the hotspot and an input element associated with a Uniform Resource Locator (URL) of a second web page including a second description associated with the hotspot. The HTML fragment is sent, by the hotspot management computing apparatus, to the requesting client computing device.

A computer readable medium having stored thereon instructions for facilitating interaction with a web page image hotspot comprising machine executable code which when executed by a processor, causes the processor to perform steps including receiving a JSONP request from a client computing device, wherein the JSONP request comprises an identifier associated with a selected hotspot associated with an image of a first web page. An HTML fragment is generated based on the identifier, wherein the HTML fragment defines a first description associated with the hotspot and an input element associated with a URL of a second web page including a second description associated with the hotspot. The HTML fragment is sent to the requesting client computing device.

A hotspot management computing apparatus includes a memory coupled to a processor which is configured to execute programmed instructions stored in the memory comprising receiving a JSONP request from a client computing device, wherein the JSONP request comprises an identifier associated with a selected hotspot associated with an image of a first web page. An HTML fragment is generated based on the identifier, wherein the HTML fragment defines a first description associated with the hotspot and an input element associated with a URL of a second web page including a second description associated with the hotspot. The HTML fragment is sent to the requesting client computing device.

A method for generating a web page image hotspot includes receiving, at a hotspot management computing apparatus, a JSONP request comprising search criteria. Content satisfying the search criteria is identified by the hotspot management computing apparatus. An HTML fragment defining an input element associated with each of one or more search results and an identifier is generated by the hotspot management computing apparatus, wherein each of the one or more search results includes at least a portion of the identified content. The HTML fragment is sent to the requesting client computing device by the hotspot management computing apparatus.

A computer readable medium having stored thereon instructions for facilitating generation of a web page image hotspot comprising machine executable code which when executed by a processor, causes the processor to perform steps including receiving a JSONP request comprising search criteria. Content satisfying the search criteria is identified. An HTML fragment defining an input element associated with each of one or more search results and an identifier is generated, wherein each of the one or more search results includes at least a portion of the identified content. The HTML fragment is sent to the requesting client computing device.

A hotspot management computing apparatus includes a memory coupled to one or more processors which are configured to execute programmed instructions stored in the memory including receiving a JSONP request comprising search criteria. Content satisfying the search criteria is identified. An HTML fragment defining an input element associated with each of one or more search results and an identifier is generated, wherein each of the one or more search results includes at least a portion of the identified content. The HTML fragment is sent to the requesting client computing device.

A method for generating a web page image hotspot includes generating, by a client computing device, a search panel in response to a user identifying a region of an image rendered on a web page as a hotspot, the search panel comprising one or more input fields. A JSONP request is sent, by the client computing device, based on interaction with the input element of the search panel, to a hotspot management computing apparatus, wherein the JSONP request comprises search criteria entered in the one or more input fields. An HTML fragment received from the hotspot management computing apparatus is rendered, by the client computing device, in a results panel, the HTML fragment defining an input element associated with each of one or more search results, wherein each input element is associated with an identifier of one of the search results. The identifier associated with a selected one of the input elements is sent, by the client computing device, to the hotspot management computing apparatus.

A non-transitory computer readable medium having stored thereon instructions for generating a web page image hotspot comprising machine executable code which when executed by a processor, causes the processor to perform steps including generating a search panel in response to a user identifying a region of an image rendered on a web page as a hotspot, the search panel comprising one or more input fields. A JSONP request is sent based on interaction with the input element of the search panel, to a hotspot management computing apparatus, wherein the JSONP request comprises search criteria entered in the one or more input fields. An HTML fragment received from the hotspot management computing apparatus is rendered in a results panel, the HTML fragment defining an input element associated with each of one or more search results, wherein each input element is associated with an identifier of one of the search results. The identifier associated with a selected one of the input elements is sent to the hotspot management computing apparatus.

A client computing device includes a memory coupled to a processor which is configured to execute programmed instructions stored in the memory including generating a search panel in response to a user identifying a region of an image rendered on a web page as a hotspot, the search panel comprising one or more input fields. A JSONP request is sent based on interaction with the input element of the search panel, to a hotspot management computing apparatus, wherein the JSONP request comprises search criteria entered in the one or more input fields. An HTML fragment received from the hotspot management computing apparatus is rendered in a results panel, the HTML fragment defining an input element associated with each of one or more search results, wherein each input element is associated with an identifier of one of the search results. The identifier associated with a selected one of the input elements is sent to the hotspot management computing apparatus.

A method for interacting with a web page image hotspot includes displaying, on a client computing device, one or more hotspots of an image included on a first web page. A JSONP request is sent, from the client computing device, to a hotspot management computing apparatus in response to user interaction with one of the one or more hotspots, wherein the JSONP request comprises an identifier associated with the one hotspot. An HTML fragment received from the hotspot management computing apparatus is rendered, on the client computing device, in a preview panel, wherein the HTML fragment is based on the identifier and defines a first description associated with the one hotspot and an input element associated with a URL of a second web page including a second description associated with the one hotspot. The second web page is displayed, on the client computing device, in response to user interaction with the input element of the preview panel.

A non-transitory computer readable medium having stored thereon instructions for interacting with a web page image hotspot comprising machine executable code which when executed by a processor, causes the processor to perform steps including displaying one or more hotspots of an image included on a first web page. A JSONP request is sent, with the client computing device, to a hotspot management computing apparatus in response to user interaction with one of the one or more hotspots, wherein the JSONP request comprises an identifier associated with the one hotspot. An HTML fragment received from the hotspot management computing apparatus is rendered, with the client computing device, in a preview panel, wherein the HTML fragment is based on the identifier and defines a first description associated with the one hotspot and an input element associated with a URL of a second web page including a second description associated with the one hotspot. The second web page is displayed, with the client computing device, in response to user interaction with the input element of the preview panel.

A client computing device including a memory coupled to a processor which is configured to execute programmed instructions stored in the memory including displaying one or more hotspots of an image included on a first web page. A JSONP request is sent, with the client computing device, to a hotspot management computing apparatus in response to user interaction with one of the one or more hotspots, wherein the JSONP request comprises an identifier associated with the one hotspot. An HTML fragment received from the hotspot management computing apparatus is rendered, with the client computing device, in a preview panel, wherein the HTML fragment is based on the identifier and defines a first description associated with the one hotspot and an input element associated with a URL of a second web page including a second description associated with the one hotspot. The second web page is displayed, with the client computing device, in response to user interaction with the input element of the preview panel.

This technology provides a number of advantages including methods, non-transitory computer readable medium, and apparatuses that facilitate establishing web page image hotspots using a plug-in sent along with a web page. The plug-in can obtain data to be associated with the hotspot from a web service hosted by a different domain using JSONP. This technology also facilitates user interaction with web page image hotspots using a plug-in configured to communicate using JSONP with a web service, which can also be hosted by a different domain.

DETAILED DESCRIPTION

Figure 1:
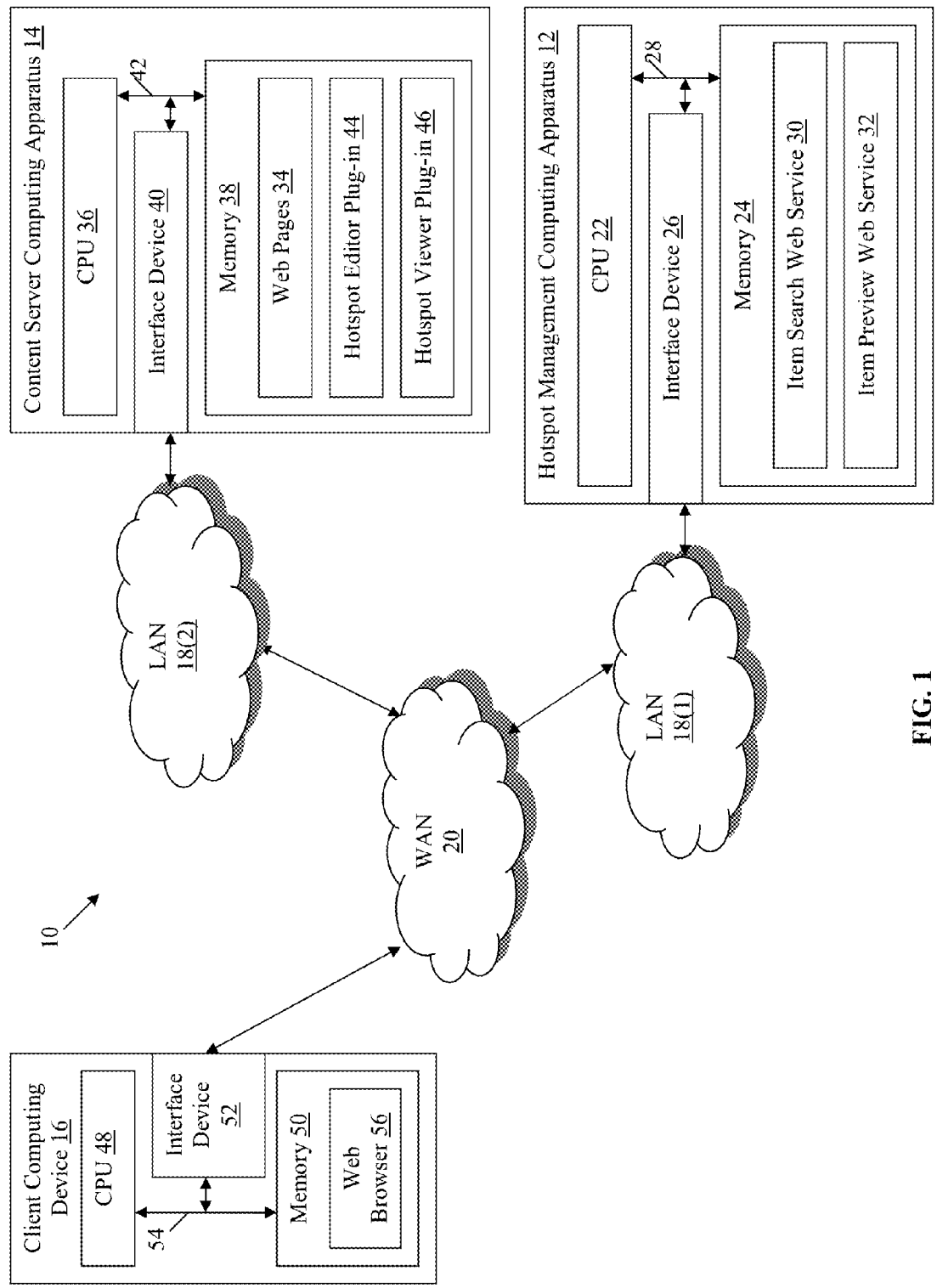
FIG. 1 is a block diagram of a network environment which incorporates an exemplary hotspot management computing apparatus.

An exemplary network environment 10 is illustrated in FIG. 1 as including an exemplary hotspot management computing apparatus 12. In this example, the hotspot management computing apparatus 12 is coupled to a content server computing apparatus 14 and a client computing device 16 by local area networks (LANs) 18(1) and 18(2) and a wide area network (WAN) 20, although other types and numbers of devices, components, and elements in other topologies could be used. This technology provides a number of advantages including methods, non-transitory computer readable medium, and apparatuses for more easily and effectively generating and viewing web page image hotspots across domains and sources of content associated with the hotspots.

Referring more specifically to FIG. 1, the hotspot management computing apparatus 12 includes at least one processor or CPU 22, a memory 24, and an interface device 26, which are coupled together by a bus 28 or other link, although other numbers and types of components, parts, devices, systems, and elements in other configurations and locations can be used. The processor 22 of the hotspot management computing apparatus 12 may execute one or more stored programmed instructions for one or more aspects of the present invention as described and illustrated by way of the embodiments herein, although the processor 22 could execute other numbers and types of programmed instructions.

The memory 24 of the hotpot management computing apparatus 12 stores these programmed instructions for one or more aspects of the present invention, as described and illustrated herein, although some or all of the programmed instructions could be stored and/or executed elsewhere. The memory 24 of the hotspot management computing apparatus 12 may include one or more tangible storage media and/or devices, such as RAM, ROM, flash memory, CD-ROM, floppy disk, hard disk drive(s), solid state memory, DVD, or any other memory storage types or devices, including combinations thereof, which are known to those of ordinary skill in the art.

In this example, the memory 24 of the hotpot management computing apparatus 12 includes an item search web service 30 and an item preview web service 32 including JavaScript instructions, for example, for one or more aspects of the present invention as described and illustrated herein, although the memory 24 can include other types and numbers of systems, devices, and elements in other configurations.

The interface device 26 in the hotspot management computing apparatus 12 is used to operatively couple and communicate between the hotspot management computing apparatus 12 and the client computing device 16 via LAN 18(1) and WAN 20, although other types and numbers of communication networks or systems with other types and numbers of connections and configurations to other devices and elements can also be used. The LANs 18(1) and 18(2) and WAN 20 can use TCP/IP over Ethernet and industry-standard protocols, including NFS, CIFS, SOAP, XML, LDAP, and SNMP, for example, although other types and numbers of communication networks can also be used.

Generally, the content server computing apparatus 14 processes requests for web pages 34 received from the client computing device 16 via LAN 18(2) and WAN 20 according to the HTTP-based protocol, for example. The content server computing apparatus 14 includes at least one processor or CPU 36, a memory 38, and an interface device 40, which are coupled together by a bus 42 or other link, although other numbers and types of components, parts, devices, systems, and elements in other configurations and locations can also be used. The processor 36 in the content server computing apparatus 14 executes a program of stored instructions for one or more aspects of the present invention, as described and illustrated by way of the embodiments herein, although the processor 36 could execute other numbers and types of programmed instructions.

The memory 38 in the content server computing apparatus 14 stores these programmed instructions for one or more aspects of the present invention, as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other non-transitory computer readable medium which is read from and/or written to by a magnetic, optical, or other reading and/or writing system that is coupled to the processor 36, can be used for the memory 38 in the content server computing apparatus 14.

In this example, the memory 38 includes a hotspot editor plug-in 44 and a hotspot viewer plug-in 46 including JavaScript instructions, for example, configured to be included in any of the web pages stored by the memory and provided in response to a client computing device request. The memory 38 can further include other types and numbers of systems, devices, and elements in other configurations which store other data.

The interface device 40 in the content server computing apparatus 14 is used to operatively couple and communicate between the content server computing apparatus 14 and the client computing device 16 via LAN 18(2) and WAN 20, although other types and numbers of communication networks with other types and numbers of connections and configurations can be used. The content server computing apparatus 14 may be hardware or software or may represent a system with multiple content server computing apparatuses in a pool, which may include internal or external networks. In this example the content server computing apparatus 14 may be any version of Microsoft® IIS server or Apache® server, although other types of content server computing apparatus 14 may be used.

The client computing device 16 enables a user to request, receive and interact with services and content hosted by the content server computing apparatus 14 and hotspot management computing apparatus 12 via the LANs 18(1) and 18(2) and WAN 20, although the client computing device 16 could access content and utilize other types and numbers of content or applications from other sources and could provide a wide variety of other functions for a user. By way of example only, the client computing device 16 can be a mobile computing device, smart phone, personal digital assistant, or computer, for example.

In this example, the client computing device 16 includes at least one processor or CPU 48, a memory 50, and an interface device 52, and which are coupled together by a bus 54 or other link, although the client computing device 16 can include other numbers and types of components, parts, devices, systems, and elements in other configurations. The processor 48 in the client computing device 16 executes a program of stored instructions for one or more aspects of the present invention as described and illustrated herein, although the processor 48 could execute other numbers and types of programmed instructions.

The memory 50 in the client computing device 16 stores these programmed instructions for one or more aspects of the present invention as described and illustrated herein, although some or all of the programmed instructions could be stored and/or executed elsewhere. A variety of different types of memory storage devices, such as a RAM or a ROM in the system or a floppy disk, hard disk, CD ROM, or other non-transitory computer readable medium which is read from and/or written to by a magnetic, optical, or other reading and/or writing system that is coupled to processor 48 can be used for the memory 50 in the client computing device 16. In this example, the client computing device 16 is configured to access web services and web content through a web browser 56 stored in the memory 50.

The interface device 52 in the client computing device 16 is used to operatively couple and communicate between the client computing device 16 and the content server computing apparatus 14 and the hotspot management computing apparatus 12 via the LANs 18(1) and 18(2) and the WAN 20, although other types and numbers of communication networks with other types and numbers of connections and configurations can be used.

Although embodiments of the hotspot management computing apparatus 12, content server computing apparatus 14, and client computing device 16 are described and illustrated herein, each of these devices can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s). Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the devices in any embodiment. Accordingly, principles and advantages of distributed processing, such as redundancy and replication also can be implemented, as desired, to increase the robustness and performance of the devices and systems of the embodiments. The embodiments may also be implemented on computer system(s) that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 2:
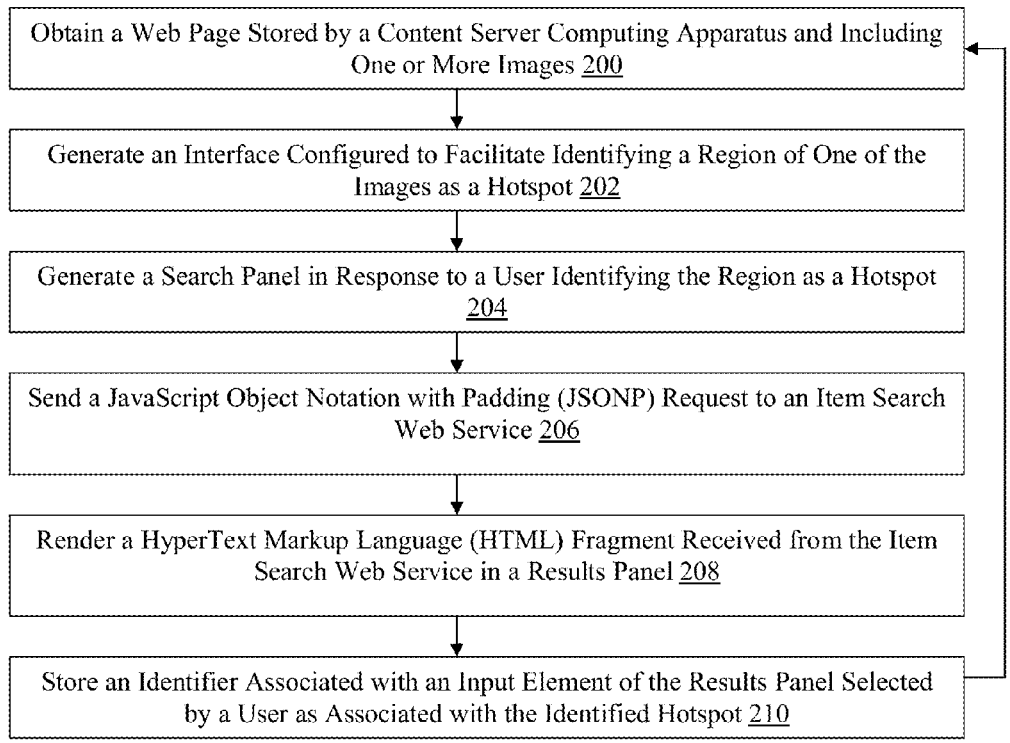
FIG. 2 is a flowchart of an exemplary method of inserting a web page image hotspot.

An exemplary method for facilitating web page image hotspots will now be described with reference to FIGS. 1-9. Referring specifically to FIG. 2, an exemplary method of inserting a web page image hotspot will now be described. In this example in step 200, a user of the client computing device 16 requests and obtains, using the web browser 56, one of the web pages 34 hosted by the content server computing apparatus 14 and including one or more images. An exemplary one of the web pages 34 stored in the memory 24 of the content server computing apparatus 14 is illustrated in FIG. 6 as web page 600, which includes an image 602.

In this example, along with sending the requested web page 600 to the client computing device 16, the content server computing apparatus 14 sends the hotspot editor plug-in 44. The content server computing apparatus 14 can send the hotspot editor plug-in 44 by inserting the JavaScript code of the plug-in 44 into the source code of the requested web page 600. In another example, the content server computing apparatus 14 provides the hotspot editor plug-in 44 along with the requested web page 600 as a bookmarklet. In yet another example, the hotspot editor plug-in 44 can be integrated within a platform, such as a blog engine or a social network platform, for example. Other methods of providing the hotspot editor plug-in 44 can also be used. Upon receiving the requested web page 600, the web browser 52 of the client computing device 16 attempts to render the requested web page on a display of the client computing device 16.

In step 202, while rendering the web page 600, and upon encountering the JavaScript code of the hotspot editor plug-in 44, the web browser 52 of the client computing device 16 executes the code to generate a hotspot identification interface. The interface is configured to facilitate identifying a region of the image 602 of the requested web page 600 as a hotspot. The interface can be presented visually by the web browser 52, such as in an overlay, new panel, or new window, for example, which allows selection of the hotspot features (e.g. size or representation style) by the user. Alternatively, the interface can be run in the background without a graphical interface while still allowing the user to select regions of the image 602 of the web page 600 to be identified as hotspots.

Figure 6:
FIG. 6 is an exemplary web page including an image and a plurality of hotspots associated with the image.
Figure 7:
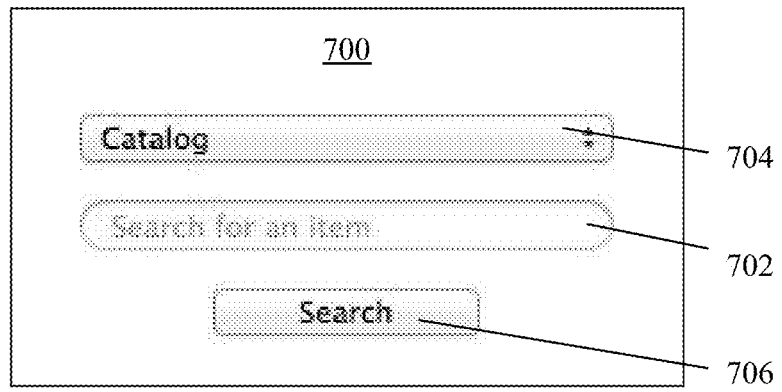
FIG. 7 is an exemplary search panel for obtaining search criteria for content to be associated with a web page image hotspot.

In step 204, the web browser 52 of the client computing device 16 executing the hotspot editor plug-in 44 generates a search panel. In this example, the web browser 52 generates the search panel in response to a user of the client computing device 16 identifying a region of the image 602 of the requested web page 600 as a hotspot using the interface generated in step 202. An exemplary identified hotspot of the image 602 of the web page 600 is illustrated as hotspot 604 in FIG. 6. Referring to FIG. 7, an exemplary search panel 700 generated by the web browser 52 of the client computing device 16 in response to the user identifying a region of the image 602 as hotspot 604 is illustrated. The search panel 700 includes one or more input fields, such as the search text field 702, a source selector element 704, and an input element, such as the search button 706, although other types and number of input fields and elements can also be used.

In this example, the source selector element 704 is a drop-down menu identifying a plurality of optional sources selectable by the user. Each source is associated by the hotspot editor plug-in 44 with a Uniform Resource Locator (URL) of an item search web service, such as the item search web service 30 stored in the memory 24 of the hotspot management computing apparatus 12, as described and illustrated in more detail below. The source selector element 704 can be populated with sources, and associated URLs, based on an identifier associated with the user sent to the content server computing apparatus 12 during an initialization or registration process. In another example, the source selector element 704 can be populated with sources, and associated URLs, based on a hardcoding by an administrator or developer of the hotspot editor plug-in 44. Other methods for populating the source selector element can also be used.

In step 206, the web browser 52 of the client computing device 16 executing the hotspot editor plug-in 44 sends, upon user interaction with the input element 706 of the search panel 700, a JavaScript Object Notation with Padding (JSONP) request to the item search web service 30 of the hotspot management computing apparatus 12. In this example, the JSONP request includes search criteria input using the input field 702 of the search panel 700 and is sent to the item search web service 30 located at the URL associated with the source selected by the user in the source selector element 704. Exemplary sources identified using the source selector element can be a product catalog, a blog post, or a social network feed, although any other types of sources can also be used.

Each source and/or item search web service 30 can be located on the same or different hotspot management computing apparatus 12. The search criteria input by the user is used by the item search web service 30 to locate content that can be presented to and identified by the user as associated with the hotspot 604. Optionally, the JSONP request further includes an attribute indicating a layout to be used as described and illustrated in more detail below. The layout can be a default layout included in the JavaScript code of the hotspot editor plug-in 44, for example, although other methods of indicating a layout can also be used.

In this example, the JSONP request is sent to a URL endpoint associated with the selected source. Additionally, the JSONP request identifies the item search web service 30 hosted by a hotspot management computing apparatus 12. By using the JSONP protocol, the hotspot editor plug-in 44 can advantageously communicate with an item search web service 30 that is cross-domain or located at a URL including a different domain, host, port, and/or application layer protocol than a URL of the content server computing apparatus 14 storing the web page 600 and the hotspot editor plug-in 44.

Accordingly, with this example of the technology, the hotspot editor plug-in 44 and item search web service 30 are decoupled such that the plug-in 44 can be included with or inserted into the source code of any of the web pages 34 and the item search web service 30 can be located on any server computing device despite web browser enforcement of a same origin policy. The URL of the item search web service 30 can be included in the hotspot editor plug-in 44 such that user interaction with the input element 706 of the search panel 700 initiates the JSONP request to the item search web service 30 located at the URL.

In step 208, the web browser 52 of the client computing device 16 executing the hotspot editor plug-in 44 renders a HyperText Markup Language (HTML) fragment. The HTML fragment is received by the web browser 52 of the client computing device from, and is generated by, the item search web service 30, as described in more detail below. The HTML fragment, when rendered, is configured to display a results panel 800, such as the results panel 800 illustrated in FIG. 8, for example. The content of the results panel 800 can also be output to a display of the client computing device 16 in the form of a new window or overlay, for example, although any other form of display can also be used.

Figure 8:
FIG. 8 is an exemplary search results panel including identified content to be associated with a web page image hotspot.

Optionally, the item search web service 30 can generate the HTML fragment according to a layout attribute value received in the JSONP request sent by the client computing device 16 in step 206. Referring more specifically to FIG. 8, in this example, the HTML fragment defines results panel input elements 802(1) and 802(2), each of which is associated with one of the search results 804(1) and 804(2). Additionally, each of the results panel input elements 802(1) and 802(2) is associated with an attribute having a value of an identifier of an associated one of the search results 804(1) and 804(2). Accordingly, in this example, the item search web service 30 processes the search criteria sent in the JSONP request in step 206 and sends a response with search results 804(1) and 804(2) and including an HTML fragment defining the display of those search results 804(1) and 804(2).

Referring back to FIG. 2, in step 210, the client computing device 16 executing the hotspot editor plug-in 44 stores the identifier associated with one of the results panel input elements 802(1) and 802(2) selected by a user to be associated with the identified hotspot 604. For example, the hotspot editor plug-in 400 can be configured to send the association information to the hotspot management computing apparatus 12 for storage in the memory 24. Thereby, the hotspot 604 of the image 602 of the web page 600 will be associated with the content of one of the search results 804(1) and 804(2) corresponding to the selected one of the results panel input elements 802(1) and 802(2). Accordingly, the content of the one of the search results 804(1) and 804(2) can be displayed by a web browser of another client computing device upon subsequent retrieval of the web page 600 and selection of the hotspot 604 by a user of the other client computing device, as described and illustrated in more detail below.

Figure 3:
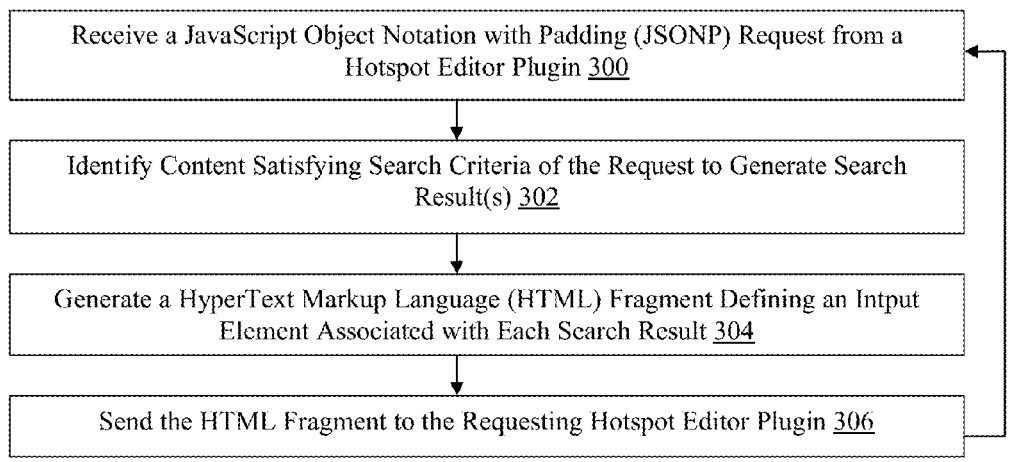
FIG. 3 is a flowchart of; an exemplary method of facilitating the association of a web page image hotspot with content.

Referring more specifically to FIG. 3, an exemplary method of facilitating the association of a web page image hotspot with content is illustrated. In this example, in step 300, the hotspot management computing apparatus 12 implementing the item search web service 30 receives a JSONP request from a hotspot editor plug-in 44, such as the JSONP request sent in step 206. As discussed above, the item search web service 30 of the hotspot management computing apparatus 12 can be located at a different domain, host, port, and/or application layer protocol than a URL of the content server computing apparatus 14 that provided the hotspot editor plug-in 44 that originated the JSONP request. The JSONP request includes search criteria submitted by a user of the client computing device 16 using the search results panel 700, such as a source of the content to be associated with the hotspot and text search terms for the content.

In step 302, the hotspot management computing apparatus 12 implementing the item search web service 30 identifies content satisfying the search criteria to generate search result(s). Accordingly, the source and text inputs, for example, can be used by the item search web service 30 to locate possible content that the user of the client computing device 16 may want to associate with an identified hotspot, such as hotspot 604 of the image 602 on the web page 600, for example, as illustrated in FIG. 6.

In step 304, the hotspot management computing apparatus 12 implementing the item search web service 30 generates an HTML fragment defining an input element associated with each search result, such as input elements 802(1) and 802(2) associated with search result 804(1) and 804(2), respectively, illustrated in FIG. 8. Additionally, an identifier of each search result 804(1) and 804(2) is associated by the item search web service 30 with each input element 802(1) and 802(2) by the HTML fragment. Optionally, the JSONP request further includes an indication of a layout to be used for presenting the search results 804(1) and 804(2) and the HTML fragment can be generated according to the layout.

In step 306, the hotspot management computing apparatus 12 implementing the item search web service 30 sends the HTML fragment to the requesting hotspot editor plug-in 44 executed by the web browser 52 of the client computing device 16. The results panel 800 shown in FIG. 8 is an example of a rendering by the web browser 52 of the client computing device 16 of the HTML fragment generated in step 306.

Figure 4:
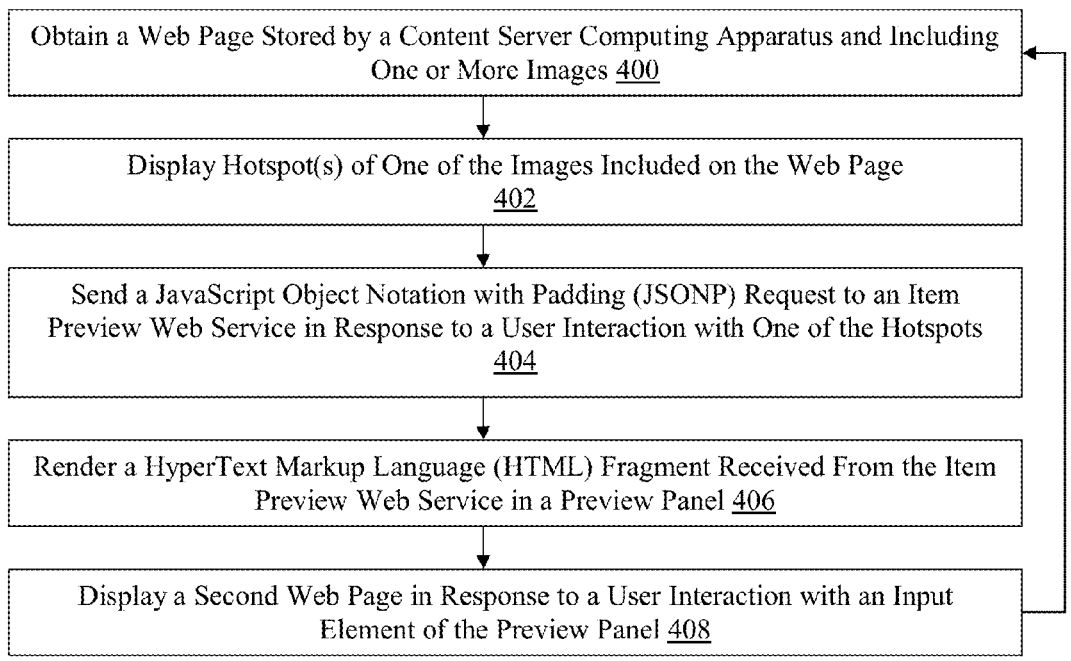
FIG. 4 is a flowchart of an exemplary method of displaying a web page image hotspot.

Referring more specifically to FIG. 4, an exemplary method of displaying a web page image hotspot is shown. In this example, in step 400, a user of the client computing device 16 requests and obtains, using the web browser 52, one of the web pages 34 hosted by the content server computing apparatus 14 and including one or more images, such as the exemplary web page 600 illustrated in FIG. 6 which includes the image 602. Along with sending the requested web page 600 to the client computing device 16, the content server computing apparatus 14 sends the hotspot viewer plug-in 46, such as by inserting the JavaScript code of the hotspot viewer plug-in 46 into the source code of the requested web page 600, although other methods of providing the hotspot viewer plug-in can also be used. The web browser 52 of the client computing device 16 then attempts to render the requested web page 600 on a display of the client computing device 16.

While rendering the web page 600, and upon encountering the JavaScript code of the hotspot viewer plug-in 46, in step 402, the web browser 52 of the client computing device 16 executes the code to display the hotspot(s) of the image(s) included in the requested web page, such as the hotspot 604 of the image 602 of the web page 600 illustrated in FIG. 6. The hotspot 604 can be inserted into the image 602 of the web page 600 as described and illustrated above with respect to FIGS. 2-3, for example, although other methods of inserting the hotspot 604 can be used.

In step 404, the web browser 52 of the client computing device 16 executing the hotspot viewer plug-in 46 sends a JSONP request to the item preview web service 32 of the hotspot management computing apparatus 12 in response to a user interaction with one of the hotspots, such as hotspot 604. In this example, the JSONP request includes an identifier associated with the hotspot 604. The identifier can be the identifier stored as described with respect to the step 210, for example. Accordingly, the web page 600 obtained from the content server computing apparatus 14 in step 400 can include one of the stored identifiers as associated with each hotspot 604. Upon user interaction with the hotspot 604 of the image 602 of the web page 600, the JSONP request including the identifier is generated and sent to the item preview web service 32.

Optionally, the JSONP request further includes an attribute indicating a layout to be used, as described and illustrated in more detail below. The layout can be a default layout included in JavaScript code of the hotspot viewer plug-in 46, for example, although other methods of indicating a layout can also be used. Also optionally, the JSONP request can further include tracking information associated with the client computing device 16 executing the hotspot viewer plug-in 46.

The item preview web service 32 can be located at a URL including a different domain, host, port, or application layer protocol than the URL of the content server computing apparatus 14 from which the web page 600 was obtained in the step 400. The URL of the item preview web service 32 can be included in the hotspot viewer plug-in 44 such that user interaction with the hotspot 604 initiates the JSONP request to the item preview web service 46 located at the URL.

In step 406, the web browser 52 of the client computing device 16 executing the hotspot viewer plug-in 46 renders an HTML fragment received from and generated by the item preview web service 32, as described and illustrated in more detail below. The HTML fragment defines a preview panel, such as the exemplary preview panel 900 illustrated in FIG. 9. The content of the preview panel 900 can also be output to a display of the client computing device 16 in the form of a new window or overlay, for example, although any other form of display can also be used.

Figure 9:
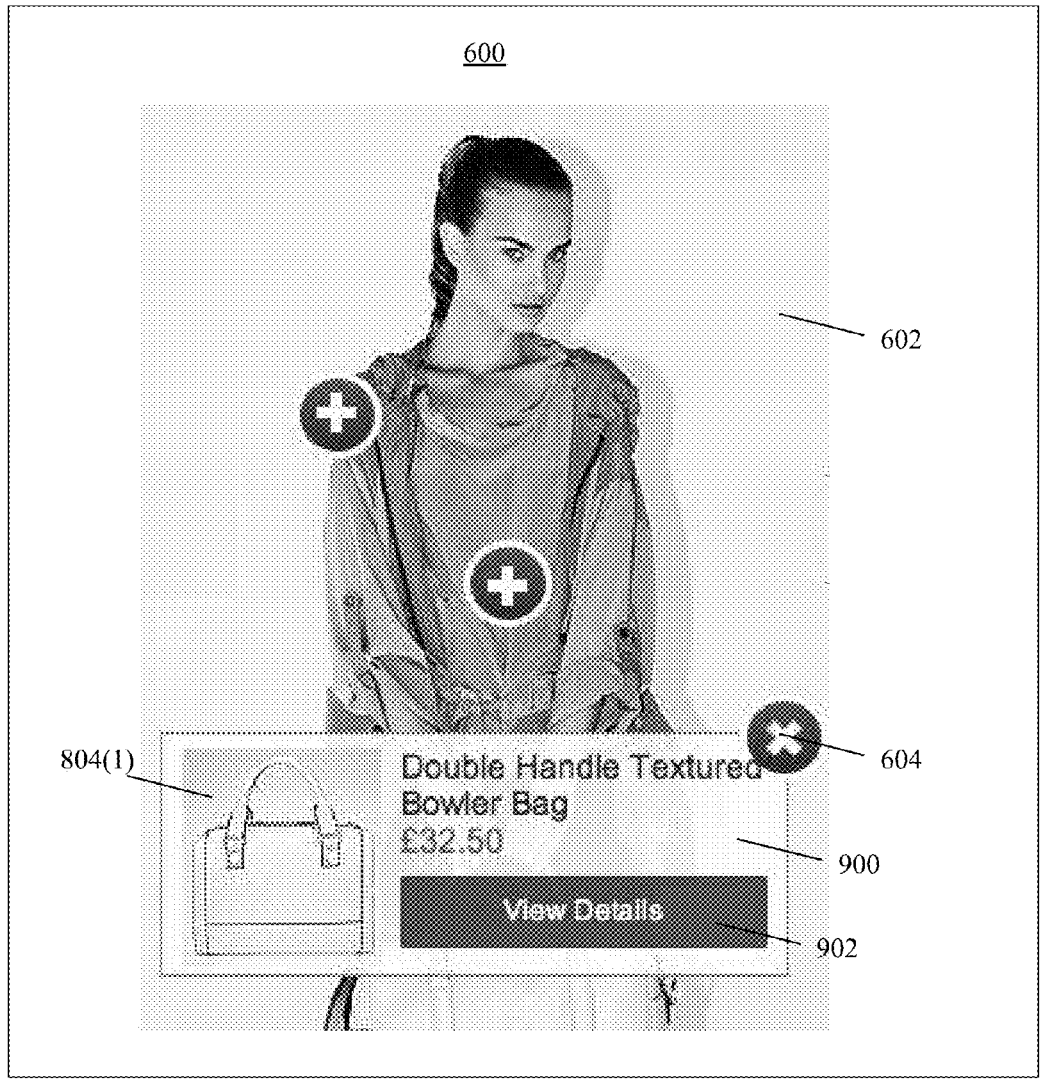
FIG. 9 is an exemplary web page including a plurality of hotspots and an exemplary preview panel associated with one of the hotspots.

The HTML fragment is generated based on the identifier and defines at least a first, generally shorter, description associated with the hotspot and an input element, such as the input element 902 illustrated in FIG. 9. Accordingly, based on the identifier, the item preview web service 32 can obtain the content associated with the hotspot 604, such as the content associated with the selected search result 804(1). Upon obtaining the content, the item preview web service 32 can generate the HTML fragment according to the layout attribute value received in the JSONP request or a default layout, for example. In some examples, the input element 902 of the preview panel 900 is associated with a URL of a second web page including a second, generally longer, description associated with the hotspot 604, such as the remaining portion(s) of the content not displayed in the preview panel 900.

In step 408, the web browser 52 of the client computing device 16 executing the hotspot viewer plug-in 46 displays the second web page in response to a user interaction with the input element 902 of the preview panel 900. Optionally, the input element of the preview panel 900 is further associated with a viewer attribute. The viewer attribute can indicate the behavior to be used to generate the second web page (e.g. in a new panel or in a new window). Accordingly, in this example, the second web page is displayed on a display of the client computing device 16 according to the viewer attribute.

Figure 5:
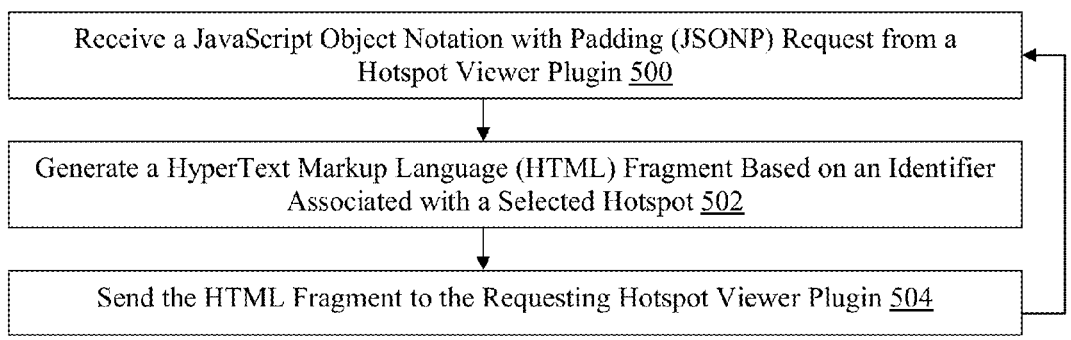
FIG. 5 is a flowchart of an exemplary method of facilitating the display of a web page image hotspot.

Referring to FIG. 5, an exemplary method of facilitating the display of a web page image hotspot is illustrated. In this example, in step 500, the hotspot management computing apparatus 12 implementing the item preview web service 32 receives a JSONP request from the hotspot viewer plug-in 46, such as the JSONP request sent in the step 404, for example. The JSONP request includes at least an identifier associated with a selected web page image hotspot, such as the hotspot 604 of the image 602 of the web page 600, for example. The item preview web service 32 of the hotspot management computing apparatus 12 can be located at a different domain, host, port, and/or application layer protocol than a URL of the content server computing apparatus 12 that provided the hotspot viewer plug-in 46 that originated the JSONP request.

In step 502, the hotspot management computing apparatus 12 implementing the item preview web service 32 generates an HTML fragment based on the identifier associated with the hotspot 604 sent along with the JSONP request. The HTML fragment defines a description associated with the hotspot 604, such the description associated with the content of the search result 804(1), as well as an input element 902, as described above. Additionally, in this example, the input element 902 is associated with a URL of a second web page including a second description associated with the selected hotspot 604 of the image 602 of the web page 600.

Optionally, the JSONP request further includes an indication of a layout to be used for presenting the preview content and the HTML fragment is generated according to the layout. Also optionally, the JSONP request includes tracking information associated with the client computing device 16 executing the hotspot viewer plug-in 46. The tracking information can be stored in the memory 24 of the hotspot management computing apparatus 12 for subsequent retrieval by an administrator, for example, although the tracking information can also be sent and/or stored elsewhere.

In step 504, the hotspot management computing apparatus 12 implementing the item preview web service 32 sends the HTML fragment to the requesting hotspot viewer plug-in 46 executed by the web browser 52 of the client computing device 16. The preview panel 900 shown in FIG. 9 is an example of a rendering by the web browser 52 of the client computing device 16 of the HTML fragment generated in step 504.

Accordingly, as illustrated and described herein this technology provides a number of advantages including improved methods, non-transitory computer readable medium, and devices for establishing and generating web page image hotspots. With this technology, inserting or editing an image hotspot of a web page can be facilitated by a JavaScript plug-in sent along with the web page. The JavaScript plug-in communicates with a JavaScript web service configured to locate content that can be associated with the hotspot. The JavaScript web service can be hosted by a hotspot management computing apparatus outside the domain of the content server apparatus hosting the web page.

Additionally, viewing image hotspots of a web page can be facilitated by a JavaScript plug-in sent along with the web page. The JavaScript plug-in communicates with a JavaScript web service configured to generate a preview panel to be displayed upon selection of one of the hotspots. The JavaScript web service can also be hosted by a hotspot management computing apparatus outside the domain of the content server apparatus hosting the web page.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for facilitating interaction with a web page image hotspot, the method comprising:
   receiving, by a hotspot management computing apparatus, a JavaScript Object Notation with Padding (JSONP) request from a client computing device, wherein the JSONP request comprises an identifier associated with a selected hotspot associated with an image of a first web page;
   generating, by the hotspot management computing apparatus, a HyperText Markup Language (HTML) fragment based on the identifier, wherein the HTML fragment defines a first description associated with the hotspot and an input element associated with a Uniform Resource Locator (URL) of a second web page including a second description associated with the hotspot; and
   sending, by the hotspot management computing apparatus, the HTML fragment to the requesting client computing device.

2. The method as set forth in claim 1, wherein the client computing device is a mobile computing device, the JSONP request further comprises an indication of a layout, and the HTML fragment is generated according to the layout.

3. The method as set forth in claim 1, wherein the JSONP request further comprises tracking information associated with the client computing device and the method further comprises storing, with the hotspot management computing apparatus, the tracking information as associated with the client computing device.

4. The method as set forth in claim 1, wherein one or more of the steps are performed by an item preview web service.

5. A non-transitory computer readable medium having stored thereon instructions for facilitating interaction with a web page image hotspot comprising machine executable code which when executed by a processor, causes the processor to perform steps comprising:
   receiving a JavaScript Object Notation with Padding (JSONP) request from a client computing device, wherein the JSONP request comprises an identifier associated with a selected hotspot associated with an image of a first web page;
   generating a HyperText Markup Language (HTML) fragment based on the identifier, wherein the HTML fragment defines a first description associated with the hotspot and an input element associated with a Uniform Resource Locator (URL) of a second web page including a second description associated with the hotspot; and
   sending the HTML fragment to the requesting client computing device.

6. The non-transitory computer readable medium as set forth in claim 5, wherein the client computing device is a mobile computing device, the JSONP request further comprises an indication of a layout, and the HTML fragment is generated according to the layout.

7. The non-transitory computer readable medium as set forth in claim 5, wherein the JSONP request further comprises tracking information associated with the client computing device and the medium further has stored thereon instructions comprising machine executable code which when executed by the processor cases the processor to perform steps further comprising storing the tracking information as associated with the client computing device.

8. The non-transitory computer readable medium as set forth in claim 5, wherein one or more of the steps are performed by an item preview web service.

9. A hotspot management computing apparatus, comprising:
   a memory coupled to a processor which is configured to execute programmed instructions stored in the memory comprising:
   receiving a JavaScript Object Notation with Padding (JSONP) request from a client computing device, wherein the JSONP request comprises an identifier associated with a selected hotspot associated with an image of a first web page;
   generating a HyperText Markup Language (HTML) fragment based on the identifier, wherein the HTML fragment defines a first description associated with the hotspot and an input element associated with a Uniform Resource Locator (URL) of a second web page including a second description associated with the hotspot; and
   sending the HTML fragment to the requesting client computing device.

10. The apparatus as set forth in claim 9, wherein the client computing device is a mobile computing device, the JSONP request further comprises an indication of a layout, and the HTML fragment is generated according to the layout.

11. The apparatus as set forth in claim 9, wherein the JSONP request further comprises tracking information associated with the client computing device and the processor is further configured to execute programmed instructions stored in the memory further comprising storing the tracking information as associated with the client computing device.

12. The apparatus as set forth in claim 9, wherein one or more of the steps are performed by an item preview web service.

13. A method for interacting with a web page image hotspot, the method comprising:
   displaying, on a client computing device, one or more hotspots of an image included on a first web page;
   sending, from the client computing device, a JavaScript Object Notation with Padding (JSONP) request to a hotspot management computing apparatus in response to user interaction with one of the one or more hotspots, wherein the JSONP request comprises an identifier associated with the one hotspot;

rendering, on the client computing device, a HyperText Markup Language (HTML) fragment received from the hotspot management computing apparatus in a preview panel, wherein the HTML fragment is based on the identifier and defines a first description associated with the one hotspot and an input element associated with a Uniform Resource Locator (URL) of a second web page including a second description associated with the one hotspot; and displaying, on the client computing device, the second web page in response to user interaction with the input element of the preview panel.

14. The method as set forth in claim 13, wherein the client computing device is a mobile computing device, the JSONP request further comprises an indication of a layout, and the HTML fragment is rendered according to the layout.

15. The method as set forth in claim 13, wherein the JSONP request further comprises tracking information associated with the client computing device.

16. The method as set forth in claim 13, wherein the client computing device is a mobile computing device, the input element of the preview panel is further associated with a viewer attribute, and the second web page is displayed according to the viewer attribute.

17. The method as set forth in claim 13, wherein the JSONP request is sent to or the HTML fragment is received from an item preview web service of the hotspot management computing apparatus.

18. A non-transitory computer readable medium having stored thereon instructions for interacting with a web page image hotspot comprising machine executable code which when executed by a processor, causes the processor to perform steps comprising:

displaying one or more hotspots of an image included on a first web page;

sending a JavaScript Object Notation with Padding (JSONP) request to a hotspot management computing apparatus in response to user interaction with one of the one or more hotspots, wherein the JSONP request comprises an identifier associated with the one hotspot;

rendering a HyperText Markup Language (HTML) fragment received from the hotspot management computing apparatus in a preview panel, wherein the HTML fragment is based on the identifier and defines a first description associated with the one hotspot and an input element associated with a Uniform Resource Locator (URL) of a second web page including a second description associated with the one hotspot; and displaying the second web page in response to user interaction with the input element of the preview panel.

19. The medium as set forth in claim 18, wherein the client computing device is a mobile computing device, the JSONP request further comprises an indication of a layout, and the HTML fragment is rendered according to the layout.

20. The medium as set forth in claim 18, wherein the JSONP request further comprises tracking information associated with the client computing device.

21. The medium as set forth in claim 18, wherein the client computing device is a mobile computing device, the input element of the preview panel is further associated with a viewer attribute, and the second web page is displayed according to the viewer attribute.

22. The medium as set forth in claim 18, wherein the JSONP request is sent to or the HTML fragment is received from an item preview web service of the hotspot management computing apparatus.

23. A client computing device, comprising:

a memory coupled to a processor which is configured to execute programmed instructions stored in the memory comprising:

displaying one or more hotspots of an image included on a first web page;

sending a JavaScript Object Notation with Padding (JSONP) request to a hotspot management computing apparatus in response to user interaction with one of the one or more hotspots, wherein the JSONP request comprises an identifier associated with the one hotspot;

rendering a HyperText Markup Language (HTML) fragment received from the hotspot management computing apparatus in a preview panel, wherein the HTML fragment is based on the identifier and defines a first description associated with the one hotspot and an input element associated with a Uniform Resource Locator (URL) of a second web page including a second description associated with the one hotspot; and displaying the second web page in response to user interaction with the input element of the preview panel.

24. The device as set forth in claim 23, wherein the client computing device is a mobile computing device, the JSONP request further comprises an indication of a layout, and the HTML fragment is rendered according to the layout.

25. The device as set forth in claim 23, wherein the JSONP request further comprises tracking information associated with the client computing device.

26. The device as set forth in claim 23, wherein the client computing device is a mobile computing device, the input element of the preview panel is further associated with a viewer attribute, and the second web page is displayed according to the viewer attribute.

27. The device as set forth in claim 23, wherein the JSONP request is sent to or the HTML fragment is received from an item preview web service of the hotspot management computing apparatus.

28. A method for generating a web page image hotspot, the method comprising:

receiving, at a hotspot management computing apparatus, a JavaScript Object Notation with Padding (JSONP) request from a client computing device, the JSONP request comprising search criteria;

identifying, by the hotspot management computing apparatus, one or more search results satisfying the search criteria;

generating, by the hotspot management computing apparatus, a HyperText Markup Language (HTML) fragment defining an input element associated with each of the one or more search results and an identifier, wherein each of the one or more search results includes content to be associated with a web page image hotspot when an associated one of the input elements is selected by a user of the client computing device; and sending, by the hotspot management computing apparatus, the HTML fragment to the client computing device.

29. The method as set forth in claim 28, wherein the client computing device is a mobile computing device, the JSONP request further comprises an indication of a layout, and the HTML fragment is generated according to the layout.

30. The method as set forth in claim 28, wherein one or more of the steps are performed by an item search web service and the JSONP request is received from a hotspot editor plug-in retrieved by the client computing device from a content server computing apparatus located in a different domain than the item search web service.

31. A non-transitory computer readable medium having stored thereon instructions for facilitating generation of a web page image hotspot comprising machine executable code which when executed by a processor, causes the processor to perform steps comprising:
   receiving a JavaScript Object Notation with Padding (JSONP) request from a client computing device, the JSONP request comprising search criteria;
   identifying one or more search results satisfying the search criteria;
   generating a HyperText Markup Language (HTML) fragment defining an input element associated with each of the one or more search results and an identifier, wherein each of the one or more search results includes content to be associated with a web page image hotspot when an associated one of the input elements is selected by a user of the client computing device; and
   sending the HTML fragment to the requesting client computing device.

32. The non-transitory computer readable medium as set forth in claim 31, wherein the client computing device is a mobile computing device, the JSONP request further comprises an indication of a layout, and the HTML fragment is generated according to the layout.

33. The non-transitory computer readable medium as set forth in claim 31, wherein one or more of the steps are performed by an item search web service and the JSONP request is received from a hotspot editor plug-in retrieved by the client computing device from a content server computing apparatus located in a different domain than the item search web service.

34. A hotspot management computing apparatus, comprising:
   a memory coupled to one or more processors which are configured to execute programmed instructions stored in the memory comprising:
      receiving a JavaScript Object Notation with Padding (JSONP) request from a client computing device, the JSONP request comprising search criteria;
      identifying one or more search results satisfying the search criteria;
      generating a HyperText Markup Language (HTML) fragment defining an input element associated with each of the one or more search results and an identifier, wherein each of the one or more search results includes content to be associated with a web page image hotspot when an associated one of the input elements is selected by a user of the client computing device; and
      sending the HTML fragment to the requesting client computing device.

35. The apparatus as set forth in claim 34, wherein the client computing device is a mobile computing device, the JSONP request further comprises an indication of a layout, and the HTML fragment is generated according to the layout.

36. The apparatus as set forth in claim 34, wherein one or more of the steps are performed by an item search web service and the JSONP request is received from a hotspot editor plug-in retrieved by the client computing device from a content server computing apparatus located in a different domain than the item search web service.

37. A method for generating a web page image hotspot, the method comprising:
   generating, by a client computing device, a search panel in response to a user identifying a region of an image rendered on a web page as a hotspot, the search panel comprising one or more input fields;
   sending, by the client computing device, based on interaction with the input element of the search panel, a JavaScript Object Notation with Padding (JSONP) request to a hotspot management computing apparatus, wherein the JSONP request comprises search criteria entered in the one or more input fields;
   receiving, by the client computing device, a HyperText Markup Language (HTML) fragment from the hotspot management computing apparatus in response to the JSONP request;
   rendering, by the client computing device, the HTML fragment in a results panel, the HTML fragment defining an input element associated with each of one or more search results, wherein each input element is associated with an identifier of one of the search results; and
   sending, by the client computing device, the identifier associated with a selected one of the input elements to the hotspot management computing apparatus.

38. The method as set forth in claim 37, wherein the client computing device is a mobile computing device, the JSONP request further comprises an indication of a layout, and the HTML fragment is rendered according to the layout.

39. The method as set forth in claim 37, wherein the JSONP request is sent to an item search web service of the hotspot management computing apparatus by a hotspot editor plug-in retrieved from a content server computing apparatus located in a different domain than the item search web service.

40. A non-transitory computer readable medium having stored thereon instructions for generating a web page image hotspot comprising machine executable code which when executed by a processor, causes the processor to perform steps comprising:
   generating a search panel in response to a user identifying a region of an image rendered on a web page as a hotspot, the search panel comprising one or more input fields;
   sending based on interaction with the input element of the search panel a JavaScript Object Notation with Padding (JSONP) request to a hotspot management computing apparatus, wherein the JSONP request comprises search criteria entered in the one or more input fields;
   receiving, by the client computing device, a HyperText Markup Language (HTML) fragment from the hotspot management computing apparatus in response to the JSONP request;
   rendering the HTML fragment in a results panel, the HTML fragment defining an input element associated with each of one or more search results, wherein each input element is associated with an identifier of one of the search results; and
   sending the identifier associated with a selected one of the input elements to the hotspot management computing apparatus.

41. The medium as set forth in claim 40, wherein the client computing device is a mobile computing device, the JSONP request further comprises an indication of a layout, and the HTML fragment is rendered according to the layout.

42. The medium as set forth in claim 40, wherein the JSONP request is sent to an item search web service of the hotspot management computing apparatus by a hotspot editor plug-in retrieved from a content server computing apparatus located in a different domain than the item search web service.

43. A client computing device, comprising:
- a memory coupled to a processor which is configured to execute programmed instructions stored in the memory comprising:
  - generating a search panel in response to a user identifying a region of an image rendered on a web page as a hotspot, the search panel comprising one or more input fields;
  - sending based on interaction with the input element of the search panel a JavaScript Object Notation with Padding (JSONP) request to a hotspot management computing apparatus, wherein the JSONP request comprises search criteria entered in the one or more input fields;
  - receiving, by the client computing device, a HyperText Markup Language (HTML) fragment from the hotspot management computing apparatus in response to the JSONP request;
  - rendering the HTML fragment in a results panel, the HTML fragment defining an input element associated with each of one or more search results, wherein each input element is associated with an identifier of one of the search results; and
  - sending the identifier associated with a selected one of the input elements to the hotspot management computing apparatus.

44. The device as set forth in claim 43, wherein the client computing device is a mobile computing device, the JSONP request further comprises an indication of a layout, and the HTML fragment is rendered according to the layout.

45. The device as set forth in claim 43, wherein the JSONP request is sent to an item search web service of the hotspot management computing apparatus by a hotspot editor plug-in retrieved from a content server computing apparatus located in a different domain than the item search web service.

* * * * *